(12) United States Patent
Muth et al.

(10) Patent No.: US 7,441,461 B2
(45) Date of Patent: Oct. 28, 2008

(54) PRESSURE PICKUP WITH TEMPERATURE COMPENSATION

(75) Inventors: Stefan Muth, Schopfheim (DE); Raimund Becher, Ehrenkirchen (DE)

(73) Assignee: Endress + Hauser GmbH + Co. KG, Maulburg (DE)

( * ) Notice: Subject to any disclaimer, the term of this patent is extended or adjusted under 35 U.S.C. 154(b) by 16 days.

(21) Appl. No.: 10/555,007

(22) PCT Filed: Apr. 29, 2004

(86) PCT No.: PCT/EP2004/004576

§ 371 (c)(1),
(2), (4) Date: Oct. 26, 2006

(87) PCT Pub. No.: WO2004/097361

PCT Pub. Date: Nov. 11, 2004

(65) Prior Publication Data

US 2007/0068264 A1     Mar. 29, 2007

(30) Foreign Application Priority Data

Apr. 29, 2003   (DE) ................ 103 19 417

(51) Int. Cl.
    *G01L 19/04* (2006.01)
(52) U.S. Cl. ........................................ 73/756
(58) Field of Classification Search ............ 73/756, 73/708
    See application file for complete search history.

(56) References Cited

U.S. PATENT DOCUMENTS

| 4,563,902 A | * | 1/1986 | Kohnlechner | ........... 73/708 |
| 4,797,007 A | * | 1/1989 | Elmore, III | ............ 374/143 |
| 4,936,147 A | * | 6/1990 | EerNisse et al. | ............ 73/702 |
| 6,267,010 B1 | | 7/2001 | Hatanaka et al. | |

FOREIGN PATENT DOCUMENTS

| DE | 2 808 469 | 9/1979 |
| DE | 28 08 469 A1 | 9/1979 |
| DE | 401 8998 | 1/1992 |
| DE | 196 08310 | 7/1997 |
| EP | 09 19796 | 6/1999 |
| EP | 1 128172 | 8/2001 |
| WO | WO 9627124 | 9/1996 |
| WO | WO 03034015 | 4/2003 |

\* cited by examiner

*Primary Examiner*—Andre J Allen
(74) *Attorney, Agent, or Firm*—Bacon & Thomas, PLLC

(57) ABSTRACT

A pressure pickup comprises: A diaphragm seal module having a diaphragm seal platform and a separating diaphragm, which is secured to the diaphragm seal platform to form a pressure chamber; a temperature sensor for registering a diaphragm seal temperature; a sensor module having a pressure measuring cell; a pressure line between the pressure chamber and the measuring cell, for loading the measuring cell with the pressure being measured; a housing, which is spaced from the diaphragm seal module and has a housing chamber in which an electronic circuit is arranged, which has inputs for signals of the pressure measuring cell and of the temperature sensor; and a canal, which extends between the housing chamber and the temperature sensor, wherein at least one electric line runs through the canal for coupling of the temperature sensor with the circuit, wherein the canal and the housing chamber form an enclosed volume, which is explosion-protected relative to the environment.

6 Claims, 1 Drawing Sheet

PRESSURE PICKUP WITH TEMPERATURE COMPENSATION

FIELD OF THE INVENTION

The present invention relates to a pressure pickup with temperature compensation. Such pressure pickups are used, for example, in areas where large temperature fluctuations are to be expected, or the temperature deviates strongly upwards or downwards from the usual ambient temperature.

BACKGROUND OF THE INVENTION

In these cases, the actual sensor body is often spatially removed from the medium whose pressure is to be registered, in order to minimize the influence of temperature on the measuring cell, and/or the sensor electronics, as the case may be. In the case of such pressure pickups, the pressure is usually registered by means of a diaphragm seal and transmitted hydraulically via a capillary tube to the sensor body. In so far as the hydraulic transmission of the pressure from the diaphragm seal to the measuring cell is temperature dependent, some diaphragm seals of the state of the art have a temperature sensor, for registering the temperature of the diaphragm seal, in order that it can be taken into consideration in the evaluation of the pressure signals registered by the measuring cell.

SUMMARY OF THE INVENTION

An object of the invention is to provide an improved pressure pickup with temperature compensation.

The object is achieved by the pressure pickup includes: A diaphragm seal module having a diaphragm seal platform and a separating diaphragm, which is secured to the diaphragm seal platform to form a pressure chamber between the media-side of the diaphragm seal platform and the separating diaphragm; a temperature sensor for registering a temperature of the diaphragm seal; a sensor module having a pressure measuring cell; a pressure line extending between the pressure chamber and the measuring cell, such that a transmission liquid in the pressure line can load the measuring cell with the pressure existing in the pressure chamber; a housing spaced from the diaphragm seal module and having a chamber, in which an electronic circuit is arranged. The electronic circuit has a first input for signals of the pressure measuring cell and a second input for signals of the temperature sensor. The pressure pickup further includes a canal, which extends between the housing chamber and the temperature sensor, with at least one electric line running through the canal for coupling the temperature sensor to the circuit, with the canal and housing chamber forming a sealed volume, which is explosion-protected relative to the environment.

In an embodiment of the invention, the housing is connected with the sensor module, or arranged immediately bordering on the sensor module or constructed with the sensor module as a single component with the housing being arranged on the side of the sensor module which faces away from the diaphragm seal module.

The canal is formed in one example of an embodiment at least sectionally by a conduit of, for example, cylindrical cross section, which is arranged between the housing and the diaphragm seal module. The housing has, in this example of an embodiment, in a first housing wall, an opening, through which the conduit communicates with the housing chamber. The first housing wall can be, for example, the housing wall facing the diaphragm seal. In an embodiment of the invention and, especially of the previously described example of an embodiment, the sensor module includes a platform, which carries the pressure measuring cell, with the first housing wall including the platform of the sensor module, or with the platform serving as first housing wall.

The connection between conduit and housing must, according to the invention, be so accomplished that the enclosed volume of the housing chamber and the canal is explosion-protected. To this end, for example, a gas-tight connection can be provided between conduit and housing, this being achievable, among other ways, by welding, soldering, brazing or glass sealing, or the conduit is arranged with a first end section in the opening, which is in the form of a bore, with the gap between the outer wall of the conduit and the wall of the bore fulfilling the requirements for a flame penetration barrier. I.e., in the case of given volume of the canal and housing chamber, the length of the first end section and the gap width must be so dimensioned that the requirements for a flame penetration barrier are fulfilled. The conduit can be secured in the opening, for example by a tack weld.

The temperature sensor for registering a temperature of the diaphragm seal module is, for example, arranged in a blind hole in the diaphragm seal platform. The conduit can be connected with its second end section with the blind hole in alignment and gas tightly with the diaphragm seal platform, this being accomplished, for example, by welding, soldering, brazing or glass seal, or the conduit is arranged with its second end section in the blind hole, with the gap between the outer conduit wall or the blind hole wall fulfilling the requirements for a flame penetration barrier. The conduit can be secured in the blind hole for example by a tack weld.

In a form of embodiment, the blind hole aligns with the opening in the first housing wall. The blind hole can conveniently have the same diameter as the opening, with the conduit, in this case, exhibiting preferably the same diameter in its first and second end sections.

In so far as the requirements for flame penetration barriers increase with the size of the enclosed volume, it is expedient to keep the additional volume of the canal small, since such must be added to the volume of the housing chamber in the determination of the requirements for the flame penetration barrier. Preferably, the volume is kept so small, that no increased requirements result.

The pressure pickups of the invention are, especially, high-temperature, pressure pickups. In the case of these pressure pickups, preferably a minimum spacing of the sensor module and the housing, with the electronic circuit, is maintained from the diaphragm seal module, in order to separate the sensor module and the housing, with the electronic circuit, thermally from the diaphragm seal module. This leads, however, to a minimum length for the canal, for the canal must bridge the spacing between the diaphragm seal module and the housing chamber. Therefore, remaining for minimizing the canal volume is its internal cross sectional area, e.g. its inner diameter, as selectable parameter.

In an example of an embodiment, the internal cross sectional area of the canal in the section formed by the conduit amounts preferably to not more than 4% and more preferably to not more than 2% of the cross sectional area of the housing chamber. Cross sectional area of the housing chamber means, in this connection, the greatest cross sectional area of the chamber in the housing, with, in the case of a housing with essentially axially symmetric geometry, the maximum cross sectional area being determined perpendicular to the axis of symmetry.

The material of the conduit has expediently a coefficient of thermal expansion similar or equal to that of the material of the diaphragm seal platform and the material of the housing. For example, the conduit, the housing and the diaphragm seal platform can be made of the same material. Suitable are, among others, metal alloys, especially steels, such as VA-steel, and Monel alloy.

The conduit can, as required, exercise a supporting function, when it is given sufficiently thick dimensions, in order to unload the pressure line mechanically. In this case, the conduit keeps the position of the housing essentially fixed with reference to the diaphragm seal module. This can be useful to the extent that the pressure line often is a capillary tube, which cannot carry much mechanical load. The mechanical unloading function is especially of interest before the final assembly of an example of an embodiment of the pressure pickup of the invention, for, after final assembly, this pressure pickup has preferably a spacing tube, which connects the housing rigidly with the diaphragm seal module and thus mechanically unloads both the conduit and the pressure line. The spacing tube has preferably such a diameter that it surrounds the conduit and the pressure line.

The details of temperature measurement are not of particular importance for the invention. The temperature sensor can be any of those available, for example a Pt-100 thermoelement. The temperature sensor can have an electrically insulating housing, for example a ceramic housing, which is arranged in the second end section of the canal, and assures a sufficient thermal contact between the temperature sensor and the diaphragm seal platform. The temperature sensor registers, according to the invention, a temperature of the diaphragm seal platform. Preferably, the registered temperature permits statements concerning a temperature in the pressure chamber between the separating diaphragm and the diaphragm seal platform. To this end, the blind hole, which extends from the media-far side of the diaphragm seal platform into the diaphragm seal platform, should have a depth such that the temperature at the bottom of the blind hole depends sufficiently strongly on the temperature in the pressure chamber.

BRIEF DESCRIPTION OF THE DRAWING

Further advantages and aspects of the invention will become evident from the dependent claims and the description of an example of an embodiment, as illustrated by the accompanying drawing, the figure of which shows as follows:

DESCRIPTION OF THE PREFERRED EMBODIMENT

Figure 1:
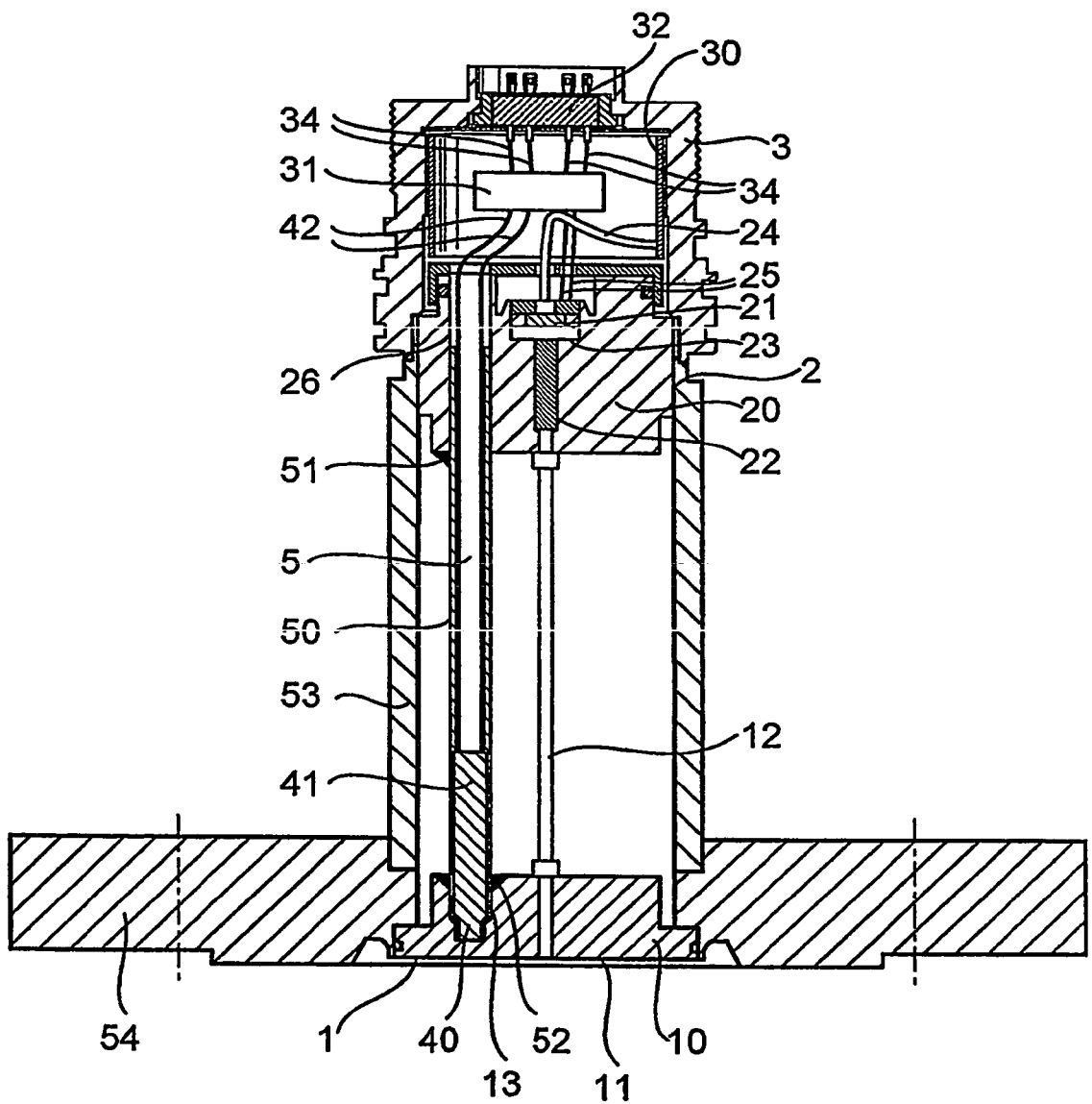
FIG. 1 a longitudinal section through a pressure pickup of the invention.

The pressure pickup shown in FIG. 1 includes: A diaphragm seal module 1; a sensor module 2 with a platform 20 and a pressure measuring cell 21; as well as a housing 3 with a housing chamber 30. Housing 3 is connected directly to the sensor module 2, with a wall of the housing 3 being formed by the platform 20.

The diaphragm seal module 1 is arranged spaced from the sensor module 2 and the housing 3. The diaphragm seal module 1 includes a diaphragm seal platform 10, on whose process-near end face a separating diaphragm 11 is arranged, which is loadable with a process pressure. The separating diaphragm seals a pressure chamber filled with a transmitting liquid, which is in communication with the pressure measuring cell via a capillary tube 12 extending between the diaphragm seal module and the sensor module. To this end, capillary tube 12 opens into a pressure canal bore 22, which extends in platform 20 into a measuring cell chamber inside the platform. Pressure measuring cell 21 is arranged in the measuring cell chamber 23. At this time, piezoresistive or capacitive pressure measuring cells are preferred; fundamentally, however, also measuring cells with other principles of measurement are suitable. The example of an embodiment shows a relative pressure pickup, with the reference pressure being brought through a reference air line 25 to the pressure measuring cell.

The measuring cell is connected via first electric lines 24 to a circuit 31 in a housing chamber 30 in the housing 3, with the circuit 31 processing the primary signal of the measuring cell, and communicating and being supplied with energy via second electric lines 34, which are connected to a feed-through 32. In the processing of the primary signal of the pressure measuring cell 21, the diaphragm seal temperature enters as a parameter. The temperature is registered by means of a temperature sensor 40, which is connected with the electric circuit 31 via the lines 42. The temperature sensor 40 is, for example, a Pt-100 temperature sensor, which is arranged in an essentially cylindrical, ceramic, measuring head 41. Measuring head 41 protrudes into a blind hole 13 in the diaphragm seal platform 10. The integration of the temperature sensor 40, respectively the measuring head 41, into the explosion-protected volume is implemented as follows.

Extending through the platform 20 is a bore 26, in which a first end section of a conduit 50 is inserted over a first insertion length I1. The outer diameter of the conduit 50 is matched to the diameter of the bore 26 and the first insertion length I1 in such a way that the remaining gap between the outer diameter of the conduit and the inner wall of the bore satisfies the requirements for a flame penetration barrier. The conduit 50 is, for example, affixed to the platform 20 with a tack weld 51. The second end section of the conduit 50 is inserted into the blind hole 13 over a second insertion length I2, with the outer diameter of the conduit 50 being so matched to the second insertion length I2 and the diameter of the blind hole 13 that the remaining gap between the outer diameter of the conduit 50 and the wall of the blind hole 13 satisfies the requirements for a flame penetration barrier. The conduit 50 is affixed to the diaphragm seal platform by means of a tack weld 52.

The measuring head 41 is arranged in the canal 5 of the conduit 50, and the lines 42 are led through the canal 5 into the housing chamber 30, where they are connected to the circuit 31. The electric insulation of the lines 42 is accomplished by a Teflon coating in the case of the described form of embodiment. Instead of a direct connection to the circuit 31, the lines 42 can in an alternative embodiment be connected to feed-through contacts 32. In this case, the temperature compensation would not be done in the circuit 31, but, instead, in a downstream unit.

While the conduit 50 can be made sufficiently stable that it can mechanically support the sensor module 2, this is not the currently preferred embodiment of the invention. Instead, a spacing tube 53 is provided, on whose first end the diaphragm seal module 1 is secured, or, more accurately, a flange 54 is secured, which carries the diaphragm seal module 1. Arranged on the second end of spacing tube 54 is the sensor module 2.

The invention claimed is:

1. A pressure pickup for registering the pressure of a medium, comprising:
 a diaphragm seal module having a diaphragm seal platform and a separating diaphragm, which is secured to said diaphragm seal platform to form a pressure chamber between said diaphragm seal platform and said separating diaphragm;

a temperature sensor for registering a temperature of said diaphragm seal module;

a sensor module having a pressure measuring cell;

a pressure line, which extends between said pressure chamber and said measuring cell, in order to load said measuring cell by means of a transmission liquid with the pressure existing in the pressure chamber;

a housing, which is spaced from said diaphragm seal module and has a housing chamber, in which an electronic circuit is arranged, which has a first input for signals of said pressure measuring cell and a second input for signals of said temperature sensor;

a spacing tube, which connects said housing rigidly with said diaphragm seal module and thus mechanically unloads both said conduit and said pressure line, said spacing tube, preferably has a diameter such that it surrounds said conduit and said pressure line; and a canal, which comprises a conduit arranged between said housing chamber and said diaphragm seal module, wherein:

at least one electric line runs through said canal for the coupling of said temperature sensor with said electric circuit;

said canal comprises a conduit, which is arranged between said housing and said diaphragm seal module, and with said housing chamber forms an enclosed volume which is explosion-protected relative to the environment;

said sensor module includes a platform, which carries said pressure measuring cell, and said housing has in a first housing wall an opening, through which said conduit communicates with said housing chamber;

said platform of said sensor module forms the first housing wall; and the connection between said conduit and said housing includes a gap satisfying the requirements for a flame penetration barrier.

2. The pressure pickup as claimed in claim 1, wherein:

said housing is arranged directly bordering on said sensor module.

3. The pressure pickup as claimed in claim 1, wherein:

said temperature sensor for registering a temperature of said diaphragm seal module is arranged in a blind hole in said diaphragm seal platform.

4. The pressure pickup as claimed in claim 3, wherein:

said conduit has an end section in said blind hold connected gas-tightly with said diaphragm seal platform.

5. The pressure pickup as claimed in claim 1, wherein:

said conduit is inserted with an end section into said blind hole; and a gap remains between the outer wall of said conduit and said blind hole, which gap fulfills the requirements for a flame penetration barrier.

6. The pressure pickup as claimed in claim 1, wherein:

said pressure pickup is an absolute or relative, pressure pickup.

\* \* \* \* \*